Jan. 27, 1931.   R. C. LANPHIER ET AL   1,790,052
METHOD OF AND APPARATUS FOR INTEGRATING VECTOR QUANTITIES
Filed Dec. 26, 1919   7 Sheets-Sheet 4

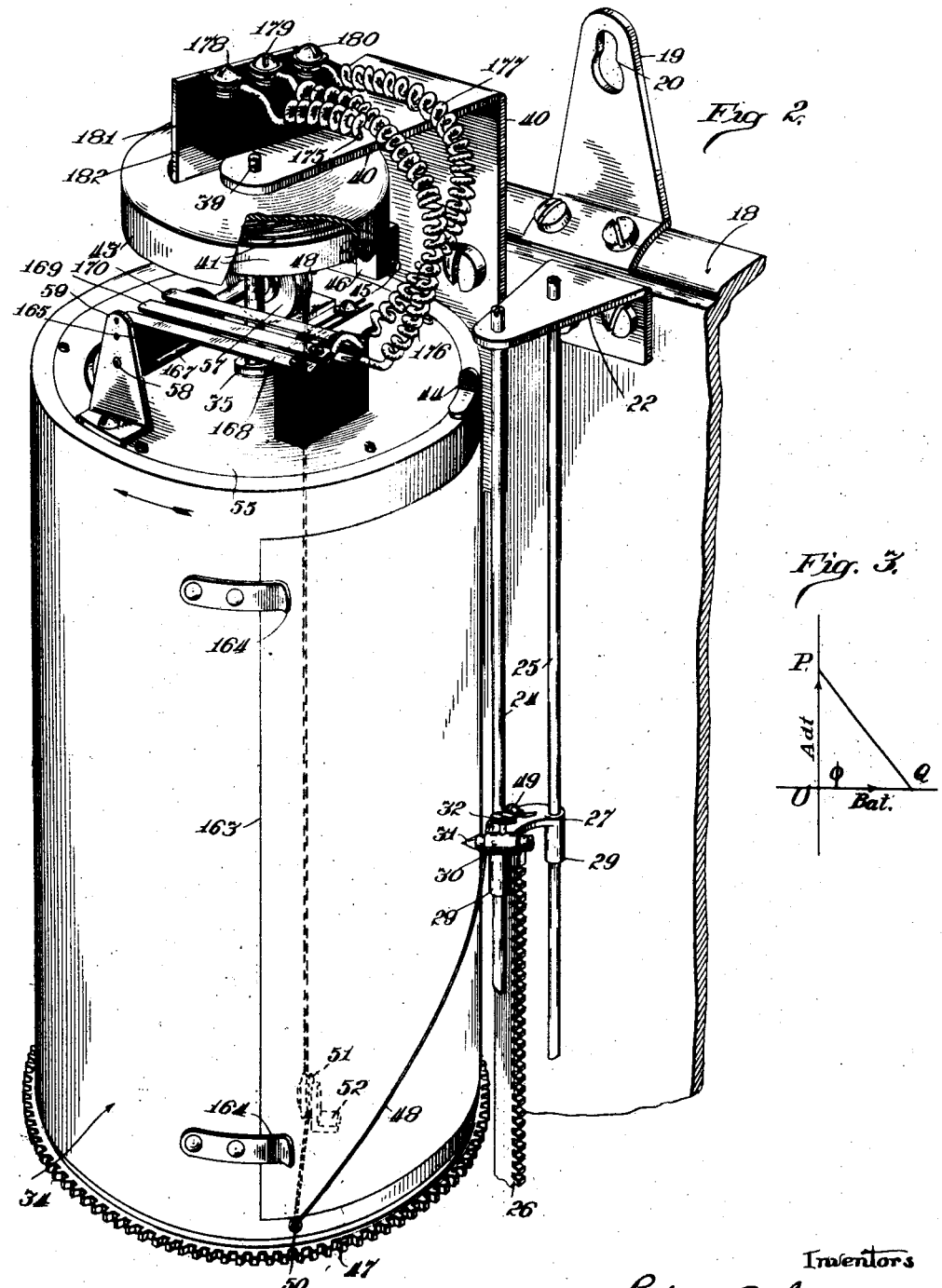

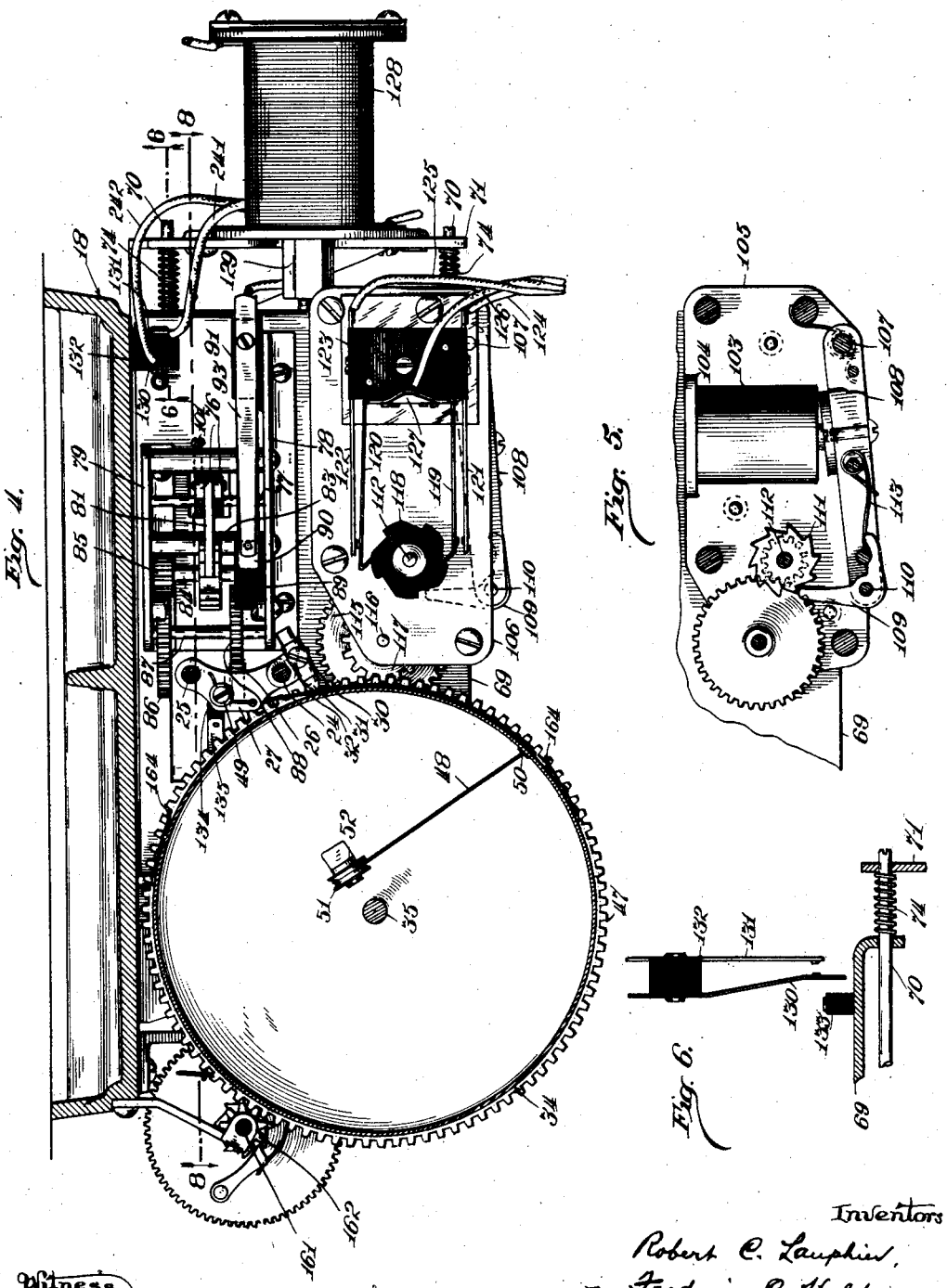

Jan. 27, 1931. R. C. LANPHIER ET AL 1,790,052
METHOD OF AND APPARATUS FOR INTEGRATING VECTOR QUANTITIES
Filed Dec. 26, 1919 7 Sheets-Sheet 5
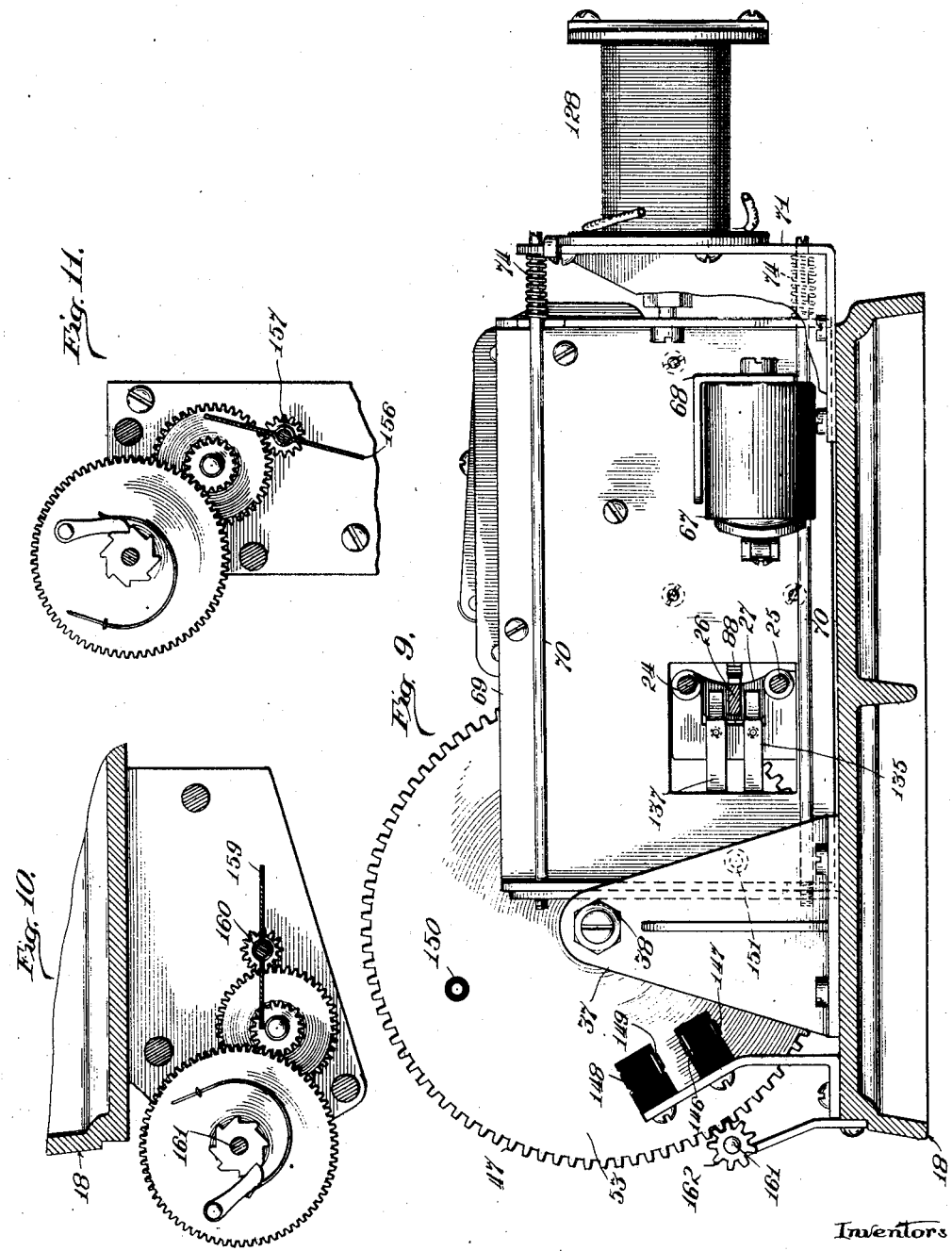

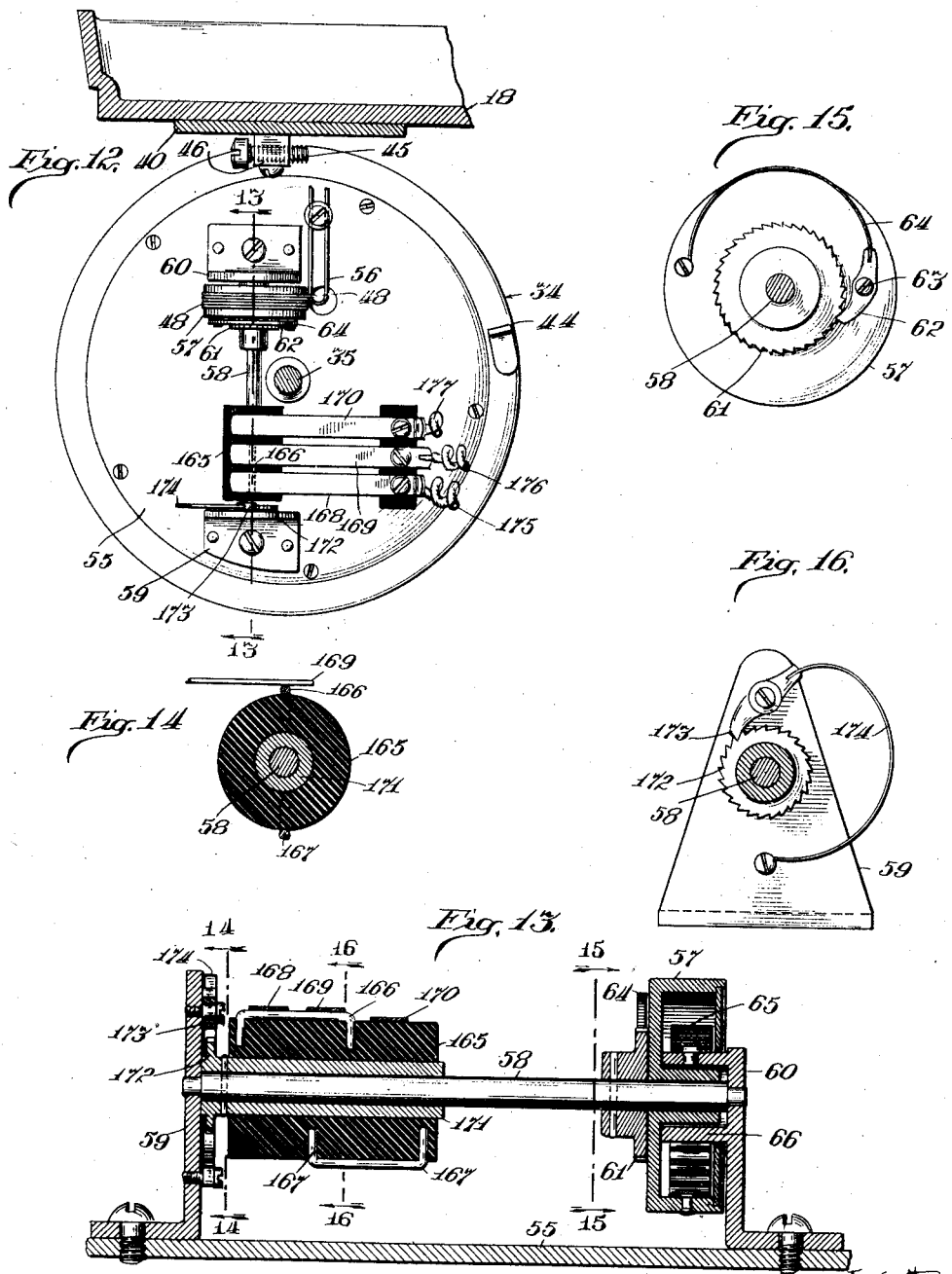

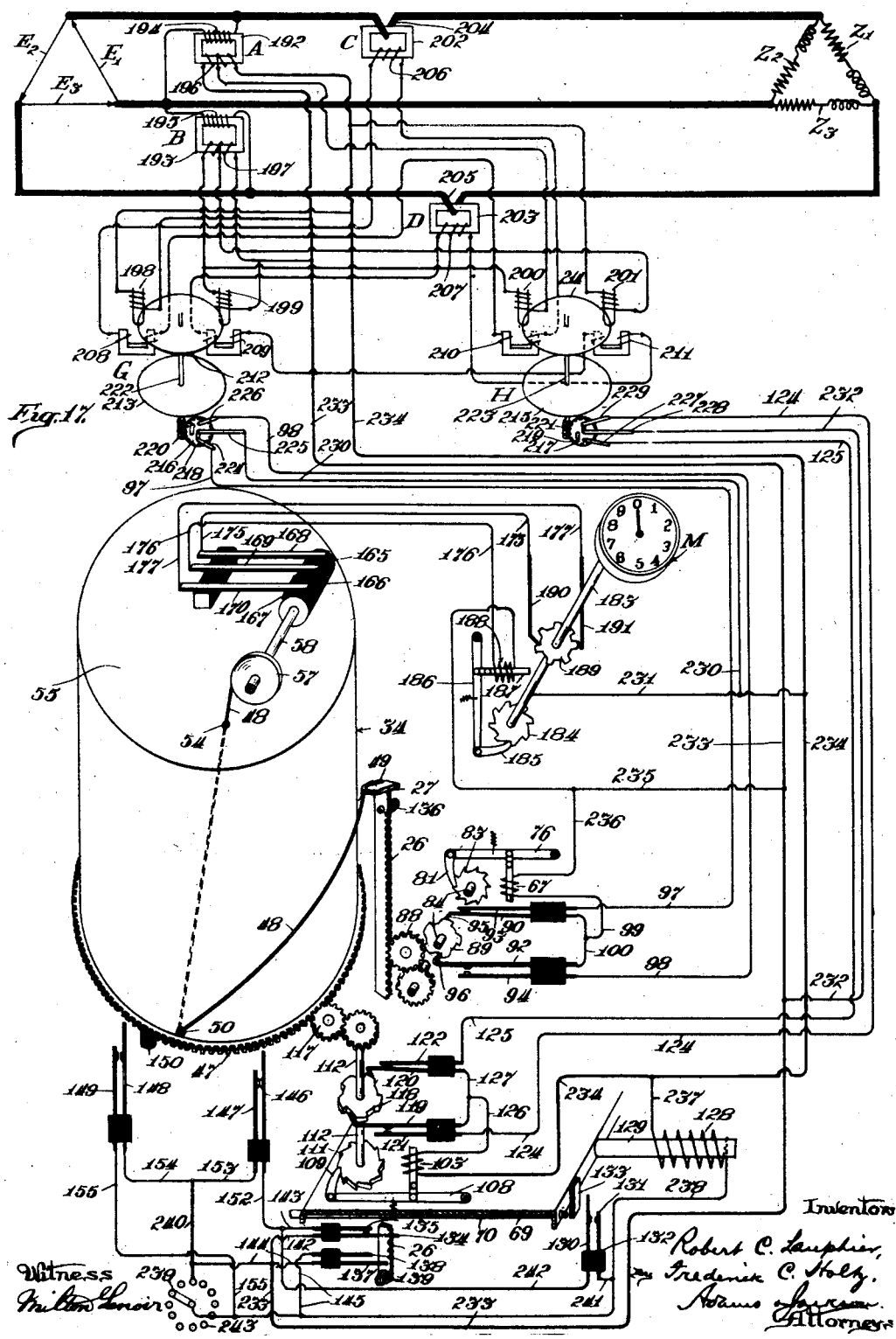
Jan. 27, 1931. R. C. LANPHIER ET AL 1,790,052
METHOD OF AND APPARATUS FOR INTEGRATING VECTOR QUANTITIES
Filed Dec. 26, 1919 7 Sheets-Sheet 7

Patented Jan. 27, 1931

1,790,052

UNITED STATES PATENT OFFICE

ROBERT C. LANPHIER AND FREDERICK C. HOLTZ, OF SPRINGFIELD, ILLINOIS, ASSIGNORS TO SANGAMO ELECTRIC COMPANY, OF SPRINGFIELD, ILLINOIS, A CORPORATION OF ILLINOIS

METHOD OF AND APPARATUS FOR INTEGRATING VECTOR QUANTITIES

Application filed December 26, 1919. Serial No. 347,385.

Our invention has to do with the measurement of forces, velocities, &c., which require a vector addition rather than arithmetical addition, as presented for example in the problem of integrating two vector quantities which while they may have a fixed direction with respect to each other, are both continuously increasing functions of a third variable, such as time, &c. A more specific illustration of this problem is found in the measurement of polyphase energy of alternating current circuits where it becomes highly desirable to integrate the apparent electrical power supplied, which requires the integration of a quantity of the form $$\sqrt{A^2+B^2}\, dt,$$

where A represents the true power supplied, B represents the reactive component of power, or wattless power supplied, and $dt$ represents a small time interval. In this case $A\, dt$ is evidently a vector moving in a given direction and changing from time to time as a function of the time, and B is a vector moving at right angles to vector A and also varying with the time, the vector difference of these vector quantities being indicated vectorially by a line A—B which froms the hypotenuse of the right angle triangle formed with the lines A—B.

The object of our invention is to provide a method by which the approximate integral or vector difference of such vector quantities can be measured and recorded or registered, and also to provide an apparatus by which such process can be practically applied, which object we accomplish as illustrated in the accompanying drawings and as hereinafter described. What we regard as new is set forth in the claims.

It should be understood that while that part of the apparatus illustrated which operates to measure the vector difference of the vector quantities is shown as applied to the measurement of the apparent energy of a polyphase alternating current circuit, generically considered such measuring apparatus may be used for other purposes and in other situations, and, therefore, any such other use is included within the scope of our invention, and is intended to be covered by the generic claims appended hereto. With this explanation we shall now proceed to a description of the particular embodiment of the apparatus illustrated and of the method practiced by such apparatus.

In the accompanying drawings,—

Fig. 2 is a perspective view of the upper part of the apparatus shown in Fig. 1, some parts being broken away;

Fig. 3 is a vector diagram of an explanatory nature;

Fig. 4 is a horizontal section on line 4—4 of Fig. 1;

Fig. 5 is a detail, being a partial horizontal section on line 5—5 of Fig. 1;

Fig. 6 is a detail, being a partial vertical section on line 6—6 of Fig. 4;

Fig. 9 is a cross-section on line 9—9 of Fig. 1 looking up, as indicated by the arrows;

Fig. 10 is a partial horizontal section on line 10—10 of Fig. 1 looking down, illustrating one of two checking devices or governors which form part of the apparatus shown in Fig. 1.

Fig. 11 is a detail illustrating the other of such checking devices;

Fig. 12 is a partial horizontal section on line 12—12 of Fig. 1 looking down;

Fig. 13 is a partial vertical section, enlarged, on line 13—13 of Fig. 12;

Fig. 14 is a detail, being a partial vertical section on line 14—14 of Fig. 13;

Fig. 15 is a vertical section on line 15—15 of Fig. 13;

Fig. 16 is a vertical section on line 16—16 of Fig. 13; and

Fig. 17 is a diagram illustrating the application of the instrument shown in the previous figures to the measurement and recording of the apparent energy of a polyphase alternating current system.

The principle involved in the apparatus illustrated will be readily understood by reference to the vector diagram of Fig. 3. Assuming two vector quantities in the same plane as starting at a given instant $t_0$ from some point O, one moving in the direction O Q and with a velocity which is a function of the time T, and the other moving at an angle $\emptyset$ from O Q and in the direction O P and such that the length O P is constantly increasing as some function of the time T, it will be apparent that at a time $dt$ after starting we have the two values O P and O Q, and their difference P Q, which is also a vector quantity whose length and direction is constantly changing with the time and which represents the approximate integral or vector difference of the two vectors O P and O Q over the time $dt$. It will also be apparent that by repeating this operation over successive small increments of time for any desired length of time the summation of the several vector quantities Q P represents the aggregate value or vector difference of the several vector quantities O P and O Q during each of the several small increments of time. This result may be represented by the equation $$\sum_{1}^{n} PQ = P_1Q_1 + P_2Q_2 + P_3Q_3 + P_nQ_n$$

where $P_1 Q_1$ represents the value of P Q during the first interval of time, $P_2 Q_2$ represents that during the second interval, &c. It will be obvious to those skilled in the art that $$\sum_{1}^{n}$$

P Q will represent as close an approximation as is desired to the true integral of the two vector quantities. This can, of course, be regulated by regulating the time interval of reset $dt$. If the vectors are moving at a uniform rate the time of reset can be made any value whatever consistent with the length of the lines O P and O Q or the mechanical devices which correspond therewith, as will be hereinafter explained. By interchanging of angles in Fig. 3 the vector differences become the vector sums of the two quantities.

Figure 1:
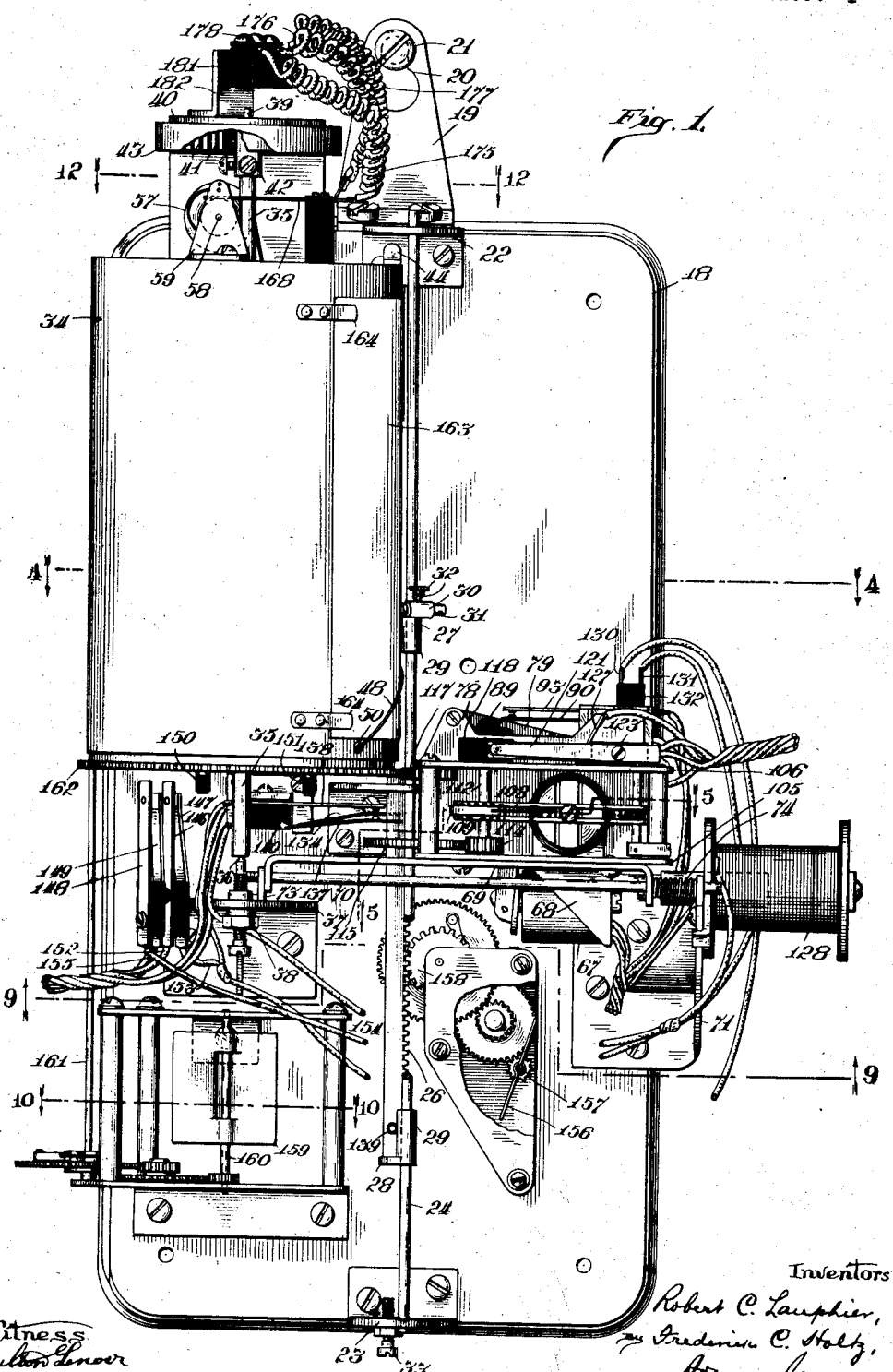
Fig. 1 is a front elevation of part of an instrument which constitutes that part of our apparatus which operates to give the algebraic sum or vector difference of two vector quantities moving at a right angle to each other and varying with respect to each other as a function of the time.

The apparatus shown in Fig. 1 operates mechanically to apply the principle explained above. It comprises a base-plate 18 of suitable size and shape to support the various parts of the instrument and preferably provided at one end with a strap 19 having an eye 20 by which it may be suspended from a wall or other suitable support by means of a nail or screw 21. 22, 23 (see Figs. 1 and 2) indicate brackets which are secured at the upper and lower ends, respectively, of the base-plate 18 and support two parallel rods 24, 25 which form guides or supports for a member which is adapted to travel longitudinally of said rods, and therefore moves vertically. This member comprises a rack bar 26 having cross-heads 27, 28 at its upper and lower ends, said cross-heads being provided with sleeves 29 which are fitted to slide freely on the rods 24, 25, as best shown in Fig. 2. In the illustrated construction the upper cross-head 27 also carries a socket 30 adapted to support a stylus or pencil 31 for making a record on a chart, as will be hereinafter explained. 32 indicates a set-screw for securing the stylus 31 in position, as best shown in Fig. 2. 33 indicates a set-screw mounted in the lower bracket 23 in position to engage the lower cross-head 28 and limit the downward movement thereof. By adjusting said set-screw the lowermost position of the vertically movable member as a whole may be accurately regulated. This vertically movable member is positively moved upward by suitable mechanism which cooperates with the rack-bar 26, as will be hereinafter described, and it returns to its lowermost position by gravity. It will be understood, therefore, that said vertically movable member may be considered as corresponding with the vector P O (illustrated in Fig. 3), O representing the lowermost or initial position of said member.

Associated with said endwise movable member is a rotary cylinder 34 which is mounted upon a vertical shaft 35, as shown in Fig. 1. The axis of the cylinder 34 is, therefore, parallel with the rods 24, 25. The shaft 35 is non-rotatably connected with the cylinder 34 so that they rotate together, said shaft being mounted at its lower end upon a pivot 36 adjustably mounted in a bracket 37 secured to the base-plate 18, as shown in Fig. 1. The pivot 36 is preferably a screw secured by a lock-nut 38 so that it may readily be adjusted vertically to vertically adjust the position of the cylinder 34. The upper end of the shaft 35 is mounted upon a pivot 39 carried by a bracket 40 secured to the upper end portion of the base-plate 18, as shown in Fig. 2. 41 indicates a coiled spring, one end of which is connected to a sleeve 42 fitted upon the upper end portion of the shaft 35 while the other end of said spring is connected to a cup-shaped housing 43 which is secured to the bracket 40, as best shown in Figs. 1 and 2. The arrangement of these parts is such that the spring 41 is put under tension by the rotation of the cylinder 34 in the direction indicated by the arrow in Fig. 2, and consequently acts to return said cylinder to its neutral or initial position when said cylinder is free to move in that direction. For determining the initial position of the cylinder 34, it is provided at its upper end near its margin with a lug 44 which is adapted to engage a screw or other adjustable stop 45 fitted in a block 46 secured to the bracket 40, as shown in Fig. 2. When the lug 44 is in engagement with the step 45 it can, of course, move only in a clockwise direction as viewed from above. For moving the cylinder 34 in such direction it is provided at its lower margin with a peripheral annular rack 47 which is engaged by suitable driving mechanism hereinafter described. It will be apparent that when the cylinder 34 is rotated any given point on its circumference will move in a direction at right angles to the direction of travel of the vertically movable member hereinbefore described, and that when the cylinder is rotated a horizontal line from its initial position to the position occupied by such point may be considered as corresponding with the vector quantity O Q, the angle Ø then being a right angle. If, therefore, the initial position of such point on the cylinder 34 coincides with some basic point on the vertically movable member, this point of coincidence will correspond with the point O in Fig. 3, and the quantities represented by the extent of movement of such basic point on the vertically movable member, and the horizontal movement of the point on the cylinder due to the rotation of the cylinder, will correspond, respectively, with the vector quantities P O and Q O. In the apparatus illustrated it follows that a line connecting the basic point on the vertically movable member and the basic point on the cylinder will represent the vector quantity P Q and as the angle Ø is a right angle will be a substantially correct measurement of the vector difference of the vector quantities P O and Q O. In the instrument illustrated this measurement is accomplished by means of a fine cord, preferably a silk thread 48, one end of which is connected to the cross-head 27, preferably by means of a screw 49, as shown in Fig. 2. Said thread passes through a jeweled eye 50 in the periphery of the cylinder 34, preferably near its lower margin, as shown in said figure. This eye is so placed that it normally coincides with the normal or initial position of the screw 49 so that the thread 48 then extends perpendicularly from the screw 49 through the eye 50. After passing through the eye 50 the thread 48 extends over a pulley 51 carried by a bracket 52 secured to the lower head 53 of the cylinder 34, as illustrated in Figs. 2 and 4, whence it passes upward through a jeweled eye 54 in the upper head 55 of said cylinder, as shown in Fig. 17. It then passes through a guide 56 in the upper head of the cylinder and over a drum 57 which is loosely mounted on a shaft 58 journaled in suitable bearings in brackets 59, 60 secured on the upper head of the cylinder, as best shown in Figs. 12 and 13. The drum 57 being loose on the shaft 58, as above stated, may rotate freely thereon in one direction, but it is prevented from rotating in the opposite direction independently of said shaft by means of a ratchet wheel 61 which is non-rotatably secured to said shaft and is engaged by a pawl 62 connected with the drum 57 at one side thereof by a pivot 63, as best shown in Fig. 15. A spring 64 normally holds the pawl 62 in operative engagement with the ratchet wheel 61. It will be apparent, therefore, that rotation of the drum 57 in a clockwise direction as viewed in Fig. 15 will rotate the shaft 58 and that said drum may rotate in the opposite direction independently of said shaft. The upper end of the thread 48 is connected to the drum 57 and initially a considerable portion of said thread is wound upon said drum. It follows that by drawing out the lower end of the thread the drum 57 will be rotated as illustrated in Fig. 17. The winding of the thread upon the drum is so arranged that when said drum is rotated by drawing out the thread it will turn in a clockwise direction as viewed in Figs. 2 and 15 and consequently rotate the shaft 58 in the same direction. The drum 57 is rotated in the opposite direction to wind the thread 48 upon it by means of a spring 65 preferably mounted inside the drum 57, as shown in Fig. 13, one end of said spring being connected with the drum and the other end with a fixed support, such as a sleeve 66 connected with the bracket 60. This spring is so arranged that unwinding of the thread from the drum puts the spring under tension sufficient to enable it to rewind the thread upon the drum, as soon as the tension on the thread is released. As hereinafter explained, when the thread is being rewound on its drum the shaft 58 is not rotated.

From the foregoing description it will be understood that starting from the neutral position of the moving parts the thread will be unwound either by upward movement of the head 27 or by horizontal movement of the eye 50 due to the rotation of the cylinder 34, or by both movements. If the cylinder 34 remains stationary in its initial position while the head 27 is moved up from such position, the thread drawn out of the cylinder through eye 50 will describe a straight vertical line, whereas if the head 27 remains stationary in its initial position and the cylinder 34 is rotated the thread drawn out will describe a horizontal line conforming in curvature to the circumference of the cylinder. If both the parts 27 and 34 move from their initial position the thread drawn out of the cylinder will extend in a diagonal line from the point 49 to the point 50, and the length of this line will correspond with the hypotenuse of a right angle triangle whose base corresponds with the horizontal distance moved by the point 50 and whose altitude corresponds with the vertical distance moved by the point 49. The length of the thread 48 outside of the cylinder, therefore, may be considered as representing a vector quantity which is the vector difference of vector quantities represented by the vertical and horizontal lines referred to. It will also be appreciated that by drawing out the thread in the manner described during a series of successive time intervals between which the moving parts are both returned instantly to their common initial position, and integrating the successive measurements made during each of such intervals, the instrument may be employed for any desired length of time to measure the total of the several vector differences of a series of vector quantities corresponding with the vectors P O and Q O of Fig. 3. The instrument shown in the drawings, as has been explained, is particularly designed for use in measuring the apparent energy of a polyphase alternating current system, and the mechanism by which the required operations are performed will now be described.

Figure 7:
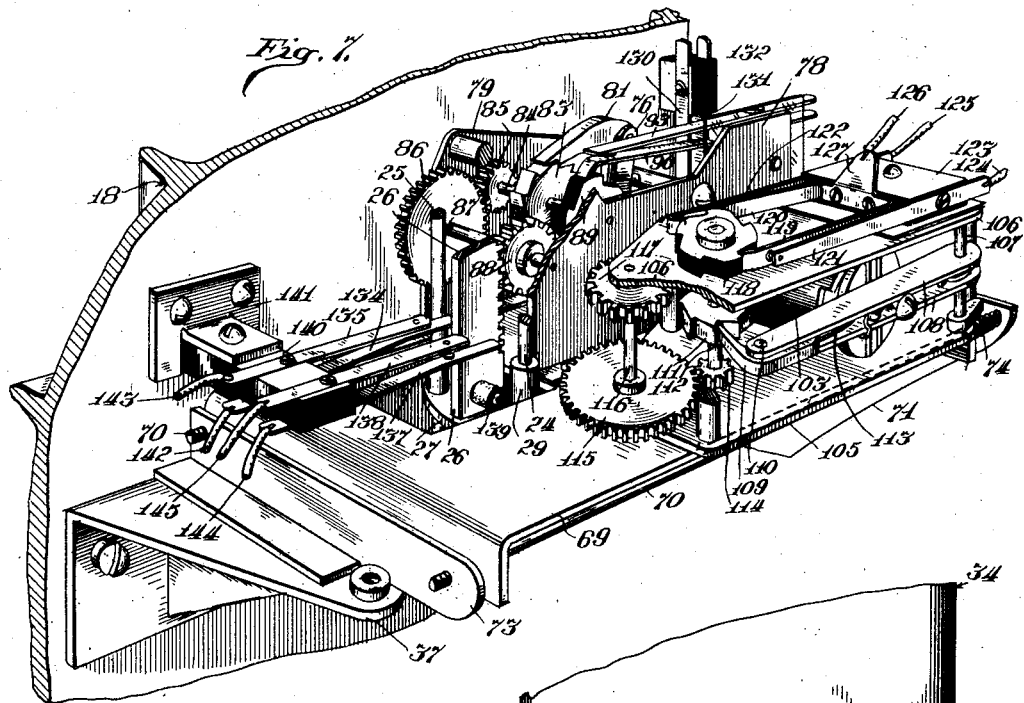
Fig. 7 is a perspective view illustrating certain parts of the apparatus shown in Fig. 1 which lies immediately below the parts shown in Fig. 2.
Figure 8:
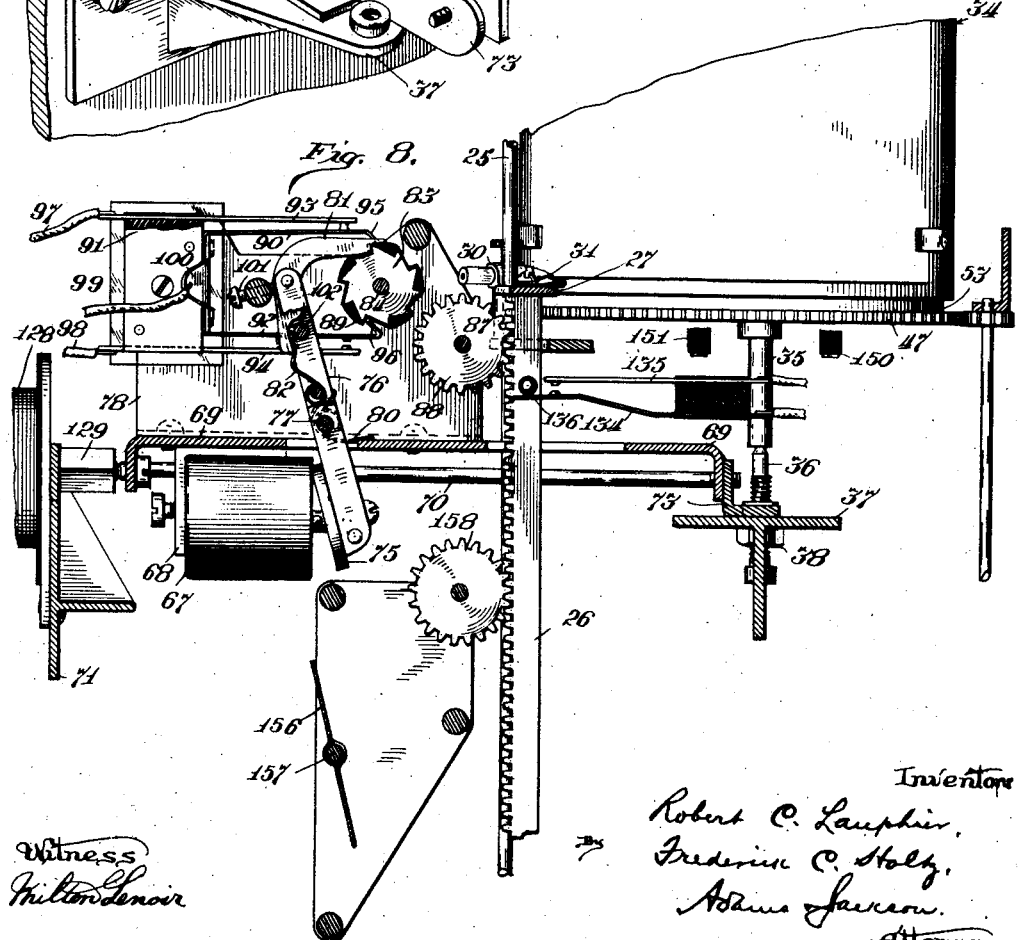
Fig. 8 is a detail, being a vertical section on line 8—8 of Fig. 4.

In Figs. 7 and 8 are illustrated the devices for moving the member 27 vertically in an upward direction. As shown particularly in Fig. 8, 67 indicates a solenoid or electromagnet which is mounted horizontally on a bracket 68 secured to and depending from a horizontal plate or carriage 69 which is loosely mounted upon a pair of parallel horizontal rods 70 suitably supported by the base plate. In the illustrated construction these rods are carried by brackets 71, 37 secured to the base-plate, as shown in Figs. 1 and 7. As shown at the right in Fig. 8, the rods 70 are connected to the bracket 37 by an angle iron 73 which is arranged in position to be engaged by the adjacent down-turned end of the plate 69, thereby forming a stop which prevents endwise movement of the plate 69 to the right from the position shown in Fig. 8. Said plate is, however, free to move slightly to the left from the position there shown for the purpose of disengaging the actuating mechanism from the rack-bar 26 and annular rack 47, as will be hereinafter described, but the plate 69 is normally and yieldingly held in the position shown in Fig. 8 by springs 74 mounted on the rods 70 between the opposite end of the plate 69 and the bracket 71, as shown in Figs. 1 and 4. 75 indicates the armature of the magnet 67, which armature is mounted on a rocking lever 76 fulcrumed upon a horizontal pivot 77, as shown in Fig. 8. The pivot 77 is mounted in suitable bearings in vertical plates 78, 79 carried by the horizontal plate 69, as best shown in Fig. 4. 80 indicates a spring which normally holds the armature 75 away from the poles of the magnet 67, as shown in Fig. 8. The lever 76 carries a pawl 81 at its upper end, which, under the stress of a spring 82, is normally held yieldingly in operative engagement with a ratchet wheel 83 mounted on a horizontal shaft 84 which is journaled in the side plates 78, 79, as shown in Figs. 4, 7 and 8. This shaft operates to move the rack-bar 26 upward through a train of reducing gears comprising a pinion 85 mounted on the shaft 84, as shown in Fig. 7, and a gear 86 meshing with said pinion, said gear being mounted on a countershaft 87 which carries a pinion 88 adapted to mesh with the rack-bar 26, as shown in said figure. The pinion 88 is normally held in mesh with said rack by the action of the springs 74 which hold the plate or carriage 69 in the position shown in Figs. 7 and 8, and it will be apparent that by moving said carriage slightly to the right from the position shown in Fig. 7 the pinion 88 may be moved out of mesh with said rack-bar, thereby leaving said rack-bar free to drop by gravity to its initial position. After an operation of this kind, as soon as the carriage 69 is released it will return to the position shown in Figs. 7 and 8 under the action of the springs 74, thereby again moving the pinion 88 into mesh with said rack-bar.

In addition to the ratchet wheel 83, the shaft 84 carries an insulated cam 89, preferably made of a block of suitable non-conducting material, as indicated in Figs. 7 and 8. This cam is similar in shape to a ratchet wheel and is adapted by its rotation to actuate one or another of two circuit closing contacts which are best shown in Fig. 8. One of these contacts 90 is in the form of a flat spring which is mounted upon a suitable supporting block 91 and extends over the cam 89, and the other contact 92 is a similar spring also mounted on the support 91 and arranged to extend under the cam 89. The contact 90 cooperates with a fixed contact 93, and the contact 92 cooperates with a fixed contact 94, both of which are secured to the support 91. As clearly shown in Fig. 8, when the contact springs 90, 92 are moved outwardly by their riding up on the prominences of the cam 89 they respectively close the circuit with their cooperating contacts, whereas when they drop into the valleys of said cam they open such circuits, and the cam is so arranged that the circuits are closed alternately by the two contacts 90, 92. Preferably, as best shown in Fig. 8, the outer or free ends of the contacts 90, 92 are shaped to form detents which prevent reverse rotation of the shaft 84, to this end the contact 90 being provided with a downwardly bent lip 95 at its outer end, and the contact 92 with a hook 96 at its outer end. 97 indicates a wire connected with the fixed contact member 93, and 98 indicates a wire which is connected with the fixed contact member 94. 99 indicates a wire which is connected to a plate 100 in electrical connection with the two movable contacts 90, 92, as clearly shown in Fig. 8. The circuits leading to the wires 97, 98, 99 will be described in connection with the explanation of the diagram shown in Fig. 17. It will suffice for the present to call attention to the fact that each energization of the magnet 67 will rotate the ratchet wheel 83 the space of one tooth and will at the same time close the circuit through one of the contacts 90, 92 and open the circuit at the other contact. This rotation of the ratchet wheel 83 will be communicated to the rack-bar 26 through the driving train thereof, and said rack-bar will be lifted accordingly. 101 indicates a regulating screw for adjusting the normal position of the lever 76, as shown in Fig. 8, and 102 indicates a limit stop for the pawl 81.

The mechanism for rotating the cylinder 34 is similar to that employed for lifting the rack-bar 26, but it is arranged at right angles to the latter mechanism, as clearly shown in Fig. 7. It comprises an electro-magnet or solenoid 103 which is also mounted on the carriage 69 and is secured to a bracket 104 carried by a side-plate 105, as shown in Fig. 5. This side plate is secured to the carriage 69, as shown in Fig. 7, and mounted between it and another side or top-plate 106 is a rock-shaft 107 which carries a lever 108 similar to the lever 76. The outer end of this lever carries a pawl 109 pivoted at 110 and adapted to engage a ratchet wheel 111 mounted on a shaft 112. The pawl 109 is yieldingly held in engagement with said ratchet wheel by a spring 113. The shaft 112 drives the cylinder 34 through a train of reducing gears comprising a pinion 114 mounted on said shaft and meshing with a gear 115 mounted on a countershaft 116. This shaft also carries a pinion 117 which meshes with the circumferential rack 47 at the lower end of the cylinder 34, as shown in Fig. 4. Obviously the cylinder 34 will be given a step by step rotation for each energization of the electro-magnet 103. The shaft 112 also carries an insulated or non-conducting cam 118 similar to the cam 89 and cooperating in a similar manner with two spring contact members 119, 120 which are respectively associated with cooperating contact members 121, 122 secured to a suitable supporting block 123, as shown in Fig. 7. 124, 125 indicate wires connecting, respectively, with the contact members 121, 122, and 126 indicates a wire connected with the movable contact members 119, 120 by means of a plate 127. The operation of these parts is similar to those described as associated with the rack-bar 26, and, therefore, it will be sufficient to mention the fact that whenever the magnet 103 is energized the cylinder 34 will be rotated accordingly and the circuit will be closed through one of the contact members 119 and opened at the other contact member 120, said contact members operating alternately to close the circuit. As both the sets of operating mechanism just described are mounted on the carriage 69 it will be apparent that when such carriage is moved away from the cylinder 34 the pinion 117 will also be moved out of mesh with the gear 47 at the lower end of the cylinder. This will permit the cylinder to return to its initial or zero position under the action of the spring 41 at the upper end of the shaft 35, as hereinbefore described, so that both said cylinder and the rack-bar 26 return simultaneously to their neutral or zero positions whenever the carriage 59 is appropriately moved.

For moving the carriage 69 out of operative position a solenoid 128 is provided, which is preferably secured to the bracket 71, as shown in Fig. 1, and is provided with a core 129 connected with said carriage so that when said solenoid is energized the drawing of the core 129 into it operates to move the carriage away from the rack-bar 26 and cylinder 34. When said carriage is so moved it operates to close a circuit through contact members 130, 131, which, as best shown in Figs. 4 and 6, are mounted upon a suitable support 132 in such position that the contact member 130 is adapted to be engaged by a stop 133 mounted on the carriage 69 in such position that when said carriage reaches the limit of its movement away from the cylinder 34 said contact member will be moved into engagement with the contact member 131. The contact member 130 is a spring arm which normally is out of contact with the contact member 131, as illustrated in Fig. 6.

134, 135 indicate two contact members which are normally in contact with each other, the member 134 being a spring arm, as shown in Fig. 8. The latter member is adapted to be engaged by a lug 136 carried by the rack-bar 26 near its upper end and so located that when said rack-bar is in its lowermost or zero position the lug 136 will hold the contact member 134 away from the contact member 135, as shown in said figure. As soon, however, as the rack-bar 26 is moved upward from its zero position the contact member 134 operatively engages the contact member 135 to form a closed circuit at that point. As shown in Fig. 7, another pair of contact members 137, 138 is mounted alongside of the contact members 134, 135, the contact members 137, 138 being normally separated as shown in said figure, and being adapted to be moved into operative engagement with each other by a lug 139 carried by the rack-bar 26 near its lower end, as shown in Figs. 1 and 7. It will be apparent, therefore, that when said rack-bar reaches the upper limit of its movement the circuit will be closed through contact members 137, 138. Preferably, as shown in Fig. 7, these two sets of contact devices are mounted on an insulating block 140 secured to a bracket 141 which is attached to the base-plate 18. 142, 143 indicate wires connected, respectively, with the contact members 134, 135, and 144, 145 indicate wires connected, respectively, with the contact members 137, 138. The functions performed by these contact devices will be hereinafter explained.

Two similar sets or pairs of contact devices are associated with the cylinder 34, as illustrated in Fig. 1. As therein shown, 146, 147 indicate two normally closed contact devices and 148, 149 indicate two normally open contact devices. The contact device 146 is adapted to be engaged and moved out of contact with the contact device 147 by a lug 150 carried by the bottom of the cylinder 34 in such position that when the said cylinder stands in its initial or zero position the contact member 146 will be out of engagement with the contact member 147. As has been explained, the contact member 148 is normally out of engagement with the contact member 149 and it is adapted to be moved into engagement therewith by a lug 151 carried by the cylinder 34 when said cylinder reaches the limit of its operating movement, thereby closing the circuit through contact members 148, 149. 152, 153 indicate wires connected, respectively, with the contact members 146, 147, and 154, 155 indicate contact wires connected, respectively, with contact members 148, 149, as shown in Figs. 1 and 17.

In order to prevent jarring of the parts when the rack-bar 26 is released and drops to its initial position a retarding or governing device is provided, preferably in the form of a rotary fan 156 carried by a shaft 157 which is connected through a suitable train of gears with the rack-bar 26, as shown in Fig. 1. This is an ordinary clockwork device arranged so that the fan 156 is driven at high speed when the rack-bar 26 drops, but not when it rises, this being effected by the interposition of ratchet mechanism of any suitable description. It is believed to be unnecessary to describe the several gears, but it may be well to point out that this train of gearing is connected with the rack-bar 26 by a pinion 158, as shown in Fig. 1. A similar device is associated with the cylinder 34, as also shown in Fig. 1, in which 159 indicates the fan mounted on a shaft 160 and connected through a suitable clockwork with a vertical shaft 161 which carries at its upper end a pinion 162 which meshes with the circumferential gear 47. In this case also the fan 159 is arranged to be rotated only by the return movement of the cylinder 34.

As in some cases it may be desired to make a graphic record of the path followed by the cord 48 during each interval between resetting periods, the cylinder 34 is arranged to carry a chart 163 which may be secured thereto by clips 164, as shown in Figs. 1, 2 and 4, so that the pencil or stylus 31 will describe on said chart a line which will follow with substantial accuracy the course of the cord 48 during any operating interval. A series of lines will, of course, be formed during successive operating intervals which may or may not coincide with each other, depending on whether the vector quantities during such intervals are or are not the same. Where the instrument is used for the purpose described the value of such graphic recording device lies in the fact that it may be used to indicate accurately the maximum kilowatt hours registered during any time interval, as well as the maximum demand in volt ampere hours during any such time interval, since it registers the maximum height recorded by the vertical position of the rack-bar 26 and also the maximum rotation of the cylinder 34 during a given time interval. It also serves to register the true relative values of the two vector quantities representing, respectively, the true power supplied and the wattless power supplied, at any given instant during any operating interval.

For operatively connecting the instrument described in an electrical system of the character referred to, the cylinder 34 is provided at its upper end with a commutator or circuit closing device comprising a drum 165 of non-conducting material which is mounted on the shaft 58, as shown in Fig. 13 and is provided, in the illustrated construction, with two contact bars 166, 167 at diametrically opposite points and in an offset relation to each other, as shown in said figure. The contact bar 166 is adapted to be simultaneously engaged by two spring brushes 168, 169 arranged to bear on the periphery of the drum 165, and the contact member 167 is adapted to be simultaneously engaged by the brush 169 and a similar brush 170, as shown in Figs. 12 and 13. The drum 165 fits tightly on a sleeve 171 which is non-rotatably secured to the shaft 58 as shown in Fig. 13, and at one end is provided with a ratchet wheel 172 engaged by a pawl 173, pivotally mounted on the bracket 59, as best shown in Figs. 13 and 16. A spring 174 yieldingly holds the pawl 173 in engagement with said ratchet wheel. By this construction when the shaft 58 is rotated in a clockwise direction as viewed in Fig. 15 by the drawing out of the thread 48, the sleeve 171 and drum 165 rotate with it, but when the thread is being rewound on its drum 57, the shaft 58, sleeve 171 and drum 165 are held against reverse rotation by the pawl 173 and ratchet wheel 172. 175, 176, 177 indicate wires connected, respectively, with the brushes 168, 169 and 170, said wires being preferably connected with binding posts 178, 179, 180, carried by a block 181 secured to a bracket 182 mounted on the housing 43, as shown in Fig. 2.

Referring now to Fig. 17, M indicates a volt ampere hour dial, the indicator of which is driven by a shaft 183 which may be similar to the shafts 84 and 112, as illustrated. It is shown as being provided with a ratchet wheel 184 actuated by a pawl 185 mounted on a rocking lever 186 similar to the lever 76 and 108. Said lever is connected to the core 187 of a solenoid 188 in such manner that when said solenoid is energized the lever is actuated to rotate the ratchet wheel 184 the space of one tooth. The shaft 183 also carries a contact disc 189 which operates to make contact alternately through contact devices 190, 191 which are connected, respectively, by wires 175 and 177 to brushes 168 and 170. The solenoid coil 188 is connected by wire 176 with the middle brush 169. It will be evident, therefore, that by the rotation of the commutator 165 the contact devices 190, 191 will be alternately connected in circuit with the solenoid coil 188, and as the arrangement is such that the contact device so connected is then in contact with the contact disc 189, by a proper connection the solenoid 188 may be energized, thereby rotating the shaft 183 and correspondingly actuating the indicator thereof.

Coming now to the manner in which the devices described are incorporated in a polyphase alternating current system for the purpose hereinbefore explained, it will be apparent that Figure 17 illustrates a 3-phase transmission system having voltages $E_1$, $E_2$ and $E_3$ between phases, and delivering energy to the three impedances $Z_1$, $Z_2$ and $Z_3$. A and B indicate potential transformers having cores 192, 193. 194, 195 indicate the primary windings of said transformers. respectively, and 196, 197 indicate the secondary windings thereof. The secondary windings 196, 197 are connected to the potential elements 198, 199 and 200, 201 of two polyphase watthour meters G, H. C, D indicate two current transformers of which 202, 203 are the cores and 204, 205 the primary windings, and 206, 207, the secondary windings. The secondary windings of the transformers C, D are connected with the current windings 208, 209 and 210, 211 of the polyphase watthour meters G, H. The method of connection provides that the discs 212, 213 of the polyphase watthour meter G shall rotate at a speed proportional to the true power delivered to the impedances $Z_1$, $Z_2$, $Z_3$, and that the discs 214, 215 of the watthour meter H shall rotate at a speed which is proportional to the wattless power supplied. As this method of connection is old and well understood in the art it is unnecessary to decribe the connections more in detail, as the operation of the novel instrument hereinbefore described will be readily understood, if it be borne in mind that one of said polyphase watthour meters, as G, measures the true energy supplied and the other, as H, measures the wattless component of the apparent energy supplied. Said meters are provided, respectively, with rotary contact discs 216, 217 operated by worm wheels 218, 219. respectively, which are driven by worms 220, 221 mounted on the armature shafts 222, 223 of said meters. Associated with contact disc 216 are three brushes 224, 225 and 226 arranged so that the brush 225 will be alternately connected with the brushes 224 and 226. In like manner three brushes 227, 228 and 229 are associated with the contact disc 217 and operate in a similar manner. The brush 224 is connected to the wire 97 which leads from the contact member 93, and the brush 226 is connected to the wire 98 which leads to the contact member 94. The brush 225 is connected by a wire 230 with a wire 231 which leads to the shaft 183 and through it to the contact disc 189. The brush 227 is connected to the wire 125 which leads to the contact device 122 and the brush 229 is connected to wire 124 which leads to contact brush 121. The brush 228 is connected by a wire 232 and a wire 233 with the secondary winding of the potential transformer A. The wire 231 is also connected with said secondary winding by a wire 234. 235 indicates a wire connecting the solenoid coil 188 with the wire 233. It will be noted from Fig. 17 that the coil of the solenoid or electromagnet 67 is connected at one side with the wire 235 by wire 236, and at the other side with the wire 99 leading to the contact members 90, 92; also that the coil of the electromagnet or solenoid 103 is connected at one side of the wire 234 and at the other side to wire 126 which leads to contact members 119, 120. The coil of solenoid 128 is connected at one side by a wire 237 with a wire 234, and at the other side is connected by a wire 238 with a normally open contact device 239, the other side of which is connected by wire 240 with the wires 153, 154, leading. respectively, to contact members 147, 148. The wire 238 is also connected to wire 155 which leads to contact member 149 and to wire 145 which leads to contact member 138. 241 indicates a wire which connects wire 238 with contact member 131, and 242 indicates a wire which connects contact member 130 with wire 143 which leads to contact member 135 and with wire 152 which leads to contact member 146. Wire 144 which leads to contact member 137 is connected to wire 240. Contact member 134 is connected by wire 142 to wire 233 which leads to the secondary winding of the potential transformer A. It will be understood, of course, that the specific wiring shown is illustrative merely, and that the several wires have been specifically pointed out and indicated by reference numerals for clarity of explanation, as obviously so long as the required connections are provided for, the specific arrangement of the wires may be varied to suit varying conditions.

As has been mentioned, the polyphase watthour meter G is connected so that it rotates with a speed proportional to the true power delivered to the impedances $Z_1$, $Z_2$ and $Z_3$, and the polyphase watthour meter H is connected so that it rotates at a speed which is proportional to the wattless power supplied, this arrangement being old and well-known in the art. With this understanding, therefore, we shall now explain the operation of the registering or indicating devices controlled, respectively, by said meters. It is apparent that the rotation of the armature shaft 222 of meter G rotates contact disc 216 so that closed circuits are alternately established respectively between brushes 224, 225 and 226, 225. In the drawings only two contact plates are shown on the discs 216 and 217, but it will be understood that the number of contact plates may be varied, as they should be directly proportional to the revolutions of the discs of the respective meters G, H. The closing of one or the other circuit through contact disc 216 causes current from the secondary winding 196 of potential transformer A to flow through one or the other of the contact members 90 or 92, which are coupled up, respectively, with the contact disc 216 in such manner that when the circuit is closed between brushes 224, 225 the circuit will also be closed through contact members 90, 93, and when the circuit is closed between brushes 226 and 225 the circuit will also be closed between contact members 92, 94. In the illustrated construction we have shown a closed circuit between brushes 224, 225 and between contact members 90, 93, and it will be apparent that with this situation the current will flow through electro-magnet 67 thereby actuating lever 76 and rotating shaft 84 so that the rack-bar 26 will be given one impulse in an upward direction. During this operation the cam 89 will be rotated, thereby breaking the circuit through contact members 90, 93 and closing the circuit through contact members 92, 94. At the same time, as the contact disc 216 continues to rotate, the circuit will be broken through brushes 224, 225 and will be closed through brushes 226, 225, whereupon a closed circuit will be established through contact members 92, 94 and electro-magnet 67, again actuating the lever 76 and giving the rack-bar 26 another impulse in an upward direction. This operation will continue as long as the meter G continues to rotate and will be controlled by the rate of rotation of the armature shaft thereof, so that the rack-bar 26 will move upward at a rate controlled by the operation of the meter G, and therefore may be considered as representing at a given instant a vector quantity representing the true energy delivered during a given interval starting with the commencement of the movement of the rack-bar. In other words, the position of the rack-bar 26 at any given instant corresponds with the vector quantity indicated by the line P O in Fig. 3, which represents the true energy delivered during any time interval $d\ t$.

It will be remembered that when the rack-bar 26 is in its zero position its lug 136 holds the contact member 134 out of contact with the contact member 135, as shown in Fig. 8, and that as soon as said rack-bar moves from its initial position contact member 134 moves into engagement with the contact member 135, so that these parts then assume the position shown in Fig. 17. It will also be recalled that when said rack-bar reaches the upper limit of its movement its lug 139 moves contact member 137 into operative engagement with contact member 138, these contact members being normally separated. When this occurs a closed circuit will be established from the secondary winding of the potential transformer A by wires 234, 237 to solenoid coil 128, and through wires 238 and 145 to contact members 138, 137, the circuit being completed through wire 233. This energizes solenoid 128, whereupon the core 129 thereof is drawn into the solenoid, thereby moving the carriage 69 to the right as viewed in Fig. 17. This moves pinion 68 out of mesh with the rack-bar 26 and permits said rack-bar to drop by gravity to its initial position, as has been explained. As soon as said rack-bar starts to descend the circuit is broken through contact members 137, 138, but the solenoid 128 remains energized until said rack-bar reaches its lowermost position, by reason of the fact that the movement of the carriage 69 out of operative position moves contact 130 into engagement with contact 131 thereby establishing a circuit from coil 128 through wires 238, 241, through contact members 131, 130, and wires 242, 143 to contact members 135, 134, and by wire 142 to wire 233, and this circuit remains established until the rack-bar 26 reaches its lowermost position, whereupon its lug 136 breaks the circuit through contact members 134, 135 in the manner previously described. If at this time the cylinder 34 is not in its initial position the circuit through solenoid coil 128 will still remain energized, as notwithstanding the breaking of the circuit through contacts 134, 135 the solenoid circuit will be completed through wire 152, contact members 146, 147 and wires 153, 240 and 144. If, however, the cylinder 34 happens to be in its initial position the contact members 146, 147 will be out of contact with each other, since they are then held out of engagement by lug 150 carried by the cylinder, as hereinbefore described. In this situation, therefore, the circuit through solenoid coil 128 will be broken, whereupon the carriage 69 will be returned to its operative position under the action of the springs 74.

The rotation of the cylinder 34 is effected in a similar manner under the control of polyphase watthour meter H which as has been explained measures the wattless component supplied. The contact disc 217 of said meter is connected up with contact members 119, 121, and 120, 122. In a similar manner it operates to rotate shaft 112 through the energization of magnet 103 at intervals controlled by the rate of rotation of the armature shaft of said meter. As has been explained the rotation of said shaft rotates the cylinder 34 and consequently the extent of movement of a point on the circumference of said cylinder from the zero position thereof represents the wattless component supplied and corresponds with the vector quantity indicated by the line Q O in Fig. 3. When the cylinder 34 reaches the limit of its operative movement its lug 150 closes the circuit through contact members 148, 149, and this also establishes a closed circuit through solenoid 128, since wire 155 connected with the contact member 149 is connected to wire 238, and wire 154 connected to contact member 148 is connected by wires 240 and 144 to wire 233. The ensuing movement of the carriage 69 out of operative position moves the driving pinion 117 out of engagement with the circumferential rack 147, whereupon the cylinder 34 is returned to its initial position by the spring 41. During this operation the solenoid 128 remains energized until the restoration of the cylinder 34 to its zero position breaks the circuit through contact members 146, 147, and the restoration of the rack-bar 26 to its zero position breaks the contact through contact members 134, 135, as has already been explained. The result of these several operations is that under the control of the two polyphase watthour meters the rack-bar 26 and cylinder 34 are respectively actuated until one or the other, or both, reach their predetermined limit of movement, whereupon they are both automatically returned to the zero position, this operation being repeated continuously as long as either of the polyphase watthour meters is in operation. During each interval the cord or thread 48 will be drawn out of the cylinder in the manner previously described, and the length of cord so drawn out during any operating interval will represent the vector difference P Q of the vector quantities O Q and O P, as has been explained.

As it may be preferred to reset the apparatus at definite time intervals rather than when one or the other operating member has reached the limit of its movement, this may be accomplished by actuating the switch 239 by a suitable clock 243, as shown in Fig. 17. As the switch 239 is connected at one side by wire 144 with wire 233, and is connected at the other side by wire 238 to solenoid coil 128, it will be apparent that the closing of the switch 239 will energize said solenoid and reset the apparatus at definite time intervals controlled by the clock. The advantages of using such an arrangement have already been pointed out.

The integration of the several measurements represented by the length of cord 48 drawn out of the cylinder during each operating interval is effected and registered by the volt ampere hour dial M through the rotation of the commutator 165 which, in the manner previously described, energizes magnet 188, thereby actuating lever 186 and rotating shaft 183 which drives the indicator of said dial. As the commutator 165 rotates in a constant direction and its operation is directly proportional to the length of cord 48 drawn out of the cylinder, it is obvious that said dial will show the sum of the lengths of cord drawn out during successive operating intervals, and will, therefore, indicate the apparent electrical energy supplied by the system.

While we consider the rack and cylinder construction shown the most desirable form in which to embody our invention, it will be apparent to those skilled in the art that various other devices for the purpose may be employed and that other forms of indicating mechanism may also be employed. The generic claims hereinafter made are, therefore, not limited to the construction shown and described, but are intended to include within their scope any and all equivalent means by which the results described can be accomplished.

The term vector difference as herein used is intended to comprehend the vector sum or difference of the vector quantities, and the claims should be construed accordingly.

What we claim as our invention and desire to secure by Letters Patent, is—

1. An apparatus for measuring the vector sum of two vector quantities moving at right angles to each other comprising a rotary cylinder, a member movable longitudinally of the axis of said cylinder and having a basic point adapted to coincide with a basic point on said cylinder when the parts are in their initial position, means for respectively actuating said cylinder and longitudinally movable member so that the extent of movement thereof respectively will represent such two vector quantities, and automatically operating means for indicating the distance between such basic points during any interval.

2. An apparatus for measuring the vector sum of two vector quantities moving at right angles to each other comprising a rotary cylinder, a member movable longitudinally of the axis of said cylinder and having a basic point adapted to coincide with a basic point on said cylinder when the parts are in their initial position, means for respectively actuating said cylinder and longitudinally movable member so that the extent of movement thereof respectively will represent such two vector quantities, means for indicating the distance between such basic points during any interval, and means for resetting said cylinder and longitudinally movable member at intervals.

3. An apparatus for measuring the vector sum of two vector quantities moving at right angles to each other comprising a rotary cylinder, a member movable longitudinally of the axis of said cylinder and having a basic point adapted to coincide with a basic point on said cylinder when the parts are in their initial position, means for respectively actuating said cylinder and longitudinally movable member so that the extent of movement thereof respectively will represent such two vector quantities, means for indicating the distance between such basic points during any interval, means for resetting said cylinder and longitudinally movable member at intervals, and means for integrating such measurements.

4. An apparatus for measuring the vector sum of two vector quantities moving at right angles to each other comprising a rotary cylinder, a member movable longitudinally of the axis of said cylinder and having a basic point adapted to coincide with a basic point on said cylinder when the parts are in their initial position, means for respectively actuating said cylinder and longitudinally movable member so that the extent of movement thereof respectively will represent such two vector quantities, and a cord extending from one of said basic points to the other for constantly indicating the distance between such points.

5. An apparatus for measuring the vector sum of two vector quantities moving at right angles to each other comprising a rotary cylinder, a member movable longitudinally of the axis of said cylinder and having a basic point adapted to coincide with a basic point on said cylinder when the parts are in their initial position, means for respectively actuating said cylinder and longitudinally movable member so that the extent of movement thereof respectively will represent such two vector quantities, a cord extending from one of said basic points to the other for constantly indicating the distance between such points, and means operated by said cord for registering the distance between said basic points.

6. An apparatus for measuring the vector sum of two vector quantities moving at an angle to each other comprising two movable members representing such vector quantities, devices responsive respectively to two variables for controlling the movement of said members respectively, said members having basic points movable along divergent paths from a point of coincidence, a cord connecting said basic points and movable by said members to constantly indicate the distance between said basic points, and means for restoring said members and said cord to their initial position at certain intervals.

7. An apparatus for measuring the vector sum of two vector quantities moving at an angle to each other comprising two movable members representing such vector quantities, devices responsive respectively to two variables for controlling the movement of said members respectively, said members having basic points movable along divergent paths from a point of coincidence, a cord connecting said basic points and movable by said members to constantly indicate the distance between said basic points, means for restoring said members and said cord to their initial position at certain intervals, and means for integrating the lengths of such cord during each of such intervals.

8. An apparatus for measuring the vector sum of two vector quantities moving at an angle to each other comprising two members having basic points movable along divergent paths from a point of coincidence, a cord connected with one of said points and guided by the other point, a drum on which said cord is wound and from which it is drawn by movement of one or the other of said movable members, means for resetting said movable members, and means for rewinding the cord upon said drum when said movable members are reset.

9. An apparatus for measuring the vector sum of two vector quantities moving at an angle to each other comprising two members having basic points movable along divergent paths from a point of coincidence, a cord connected with one of said points and guided by the other point, a drum on which said cord is wound and from which it is is drawn by movement of one or the other of said movable members, means for resetting said movable members, means for rewinding the cord upon said drum when said movable members are reset, and indicating mechanism actuated by the unwinding of said cord from said drum.

10. An apparatus for measuring the vector sum of two vector quantities moving at right angles to each other comprising two members having basic points movable along divergent paths from a point of coincidence, one of said members being a rotary cylinder and the other a member movable longitudinally of the axis of said cylinder, a cord connected with a basic point on the latter member and extending through an eye in the periphery of said cylinder corresponding with the basic point of said cylinder, a drum on which said cord is wound and from which it is unwound by the movement of either of said members, means for resetting said members to their initial position, and means for rewinding said cord upon said drum when said movable members are reset.

11. An apparatus for measuring the vector sum of two vector quantities moving at right angles to each other comprising two members having basic points movable along divergent paths from a point of coincidence, one of said members being a rotary cylinder and the other a member movable longitudinally of the axis of said cylinder, a cord connected with a basic point on the latter member and extending through an eye in the periphery of said cylinder corresponding with the basic point of said cylinder, a drum on which said cord is wound and from which it is unwound by the movement of either of said members, electrically operated mechanism for resetting said movable members to their initial position after certain intervals, and means for rewinding said cord upon said drum when said movable members are reset.

12. An apparatus for measuring the vector sum of two vector quantities moving at right angles to each other comprising two members having basic points movable along divergent paths from a point of coincidence, one of said members being a rotary cylinder and the other a member movable longitudinally of the axis of said cylinder, a cord connected with a basic point on the latter member and extending through an eye in the periphery of said cylinder corresponding with the basic point of said cylinder, a drum on which said cord is wound and from which it is unwound by the movement of either of said members, electrically operated mechanism for resetting said movable members to their initial position after certain intervals, means for rewinding said cord upon said drum when said movable members are reset, and integrating mechanism operated by the unwinding of said cord from said drum.

13. An apparatus for measuring the vector sum of two vector quantities moving at right angles to each other comprising two members having basic points movable along divergent paths from a point of coincidence, one of said members being a rotary cylinder and the other a member movable longitudinally of the axis of said cylinder, a cord connected with a basic point on the latter member and extending through an eye in the periphery of said cylinder corresponding with the basic point of said cylinder, a drum on which said cord is wound and from which it is unwound by the movement of either of said members, electrically operated mechanism for resetting said movable members to their initial position after certain intervals, means for rewinding said cord upon said drum when said movable members are reset, and electrically operated integrating mechanism actuated by the unwinding of said cord from said drum.

14. An apparatus of the character described comprising two members movable at right angles to each other, one of said members consisting of a rotary cylinder and the other consisting of a member movable longitudinally of the axis of said cylinder, said members having normally coincident basic points, a cord connected with the basic point on said longitudinally movable member and extending through an eye in the periphery of said cylinder, a drum on which said cord is wound and from which it is unwound by the movement of either of said members from their initial position, actuating devices for moving said cylinder and said longitudinally movable member away from their initial position, and means for simultaneously disconnecting said actuating devices with said cylinder and longitudinally movable member to permit them to return to their initial position.

15. An apparatus of the character described comprising a cylinder adapted to rotate about a vertical axis, a vertically movable member mounted adjacent to said cylinder, said cylinder and vertically movable member having normally coincident basic points, a cord connected with the basic point on said vertically movable member and extending through an eye in the periphery of said cylinder corresponding with the basic point thereof, a drum on which said cord is wound and from which it is unwound by the movement of either of said basic points from their point of coincidence, racks connected respectively with said vertically movable member and with said cylinder, a carriage, actuating devices mounted on said carriage for engaging said racks respectively, and means for moving said carriage to disengage said actuating devices from said racks to permit said cylinder and vertically movable member to return to their initial position.

16. An apparatus of the character described comprising a cylinder adapted to rotate about a vertical axis, a vertically movable member mounted adjacent to said cylinder, said cylinder and vertically movable member having normally coincident basic points, a cord connected with the basic point on said vertically movable member and extending through an eye in the periphery of said cylinder corresponding with the basic point thereof, a drum on which said cord is wound and from which it is unwound by the movement of either of said basic points from their point of coincidence, racks connected respectively with said vertically movable member and with said cylinder, a carriage, electrically operated actuating devices mounted on said carriage for engaging said racks respectively, and electrically operated means for moving said carriage to disengage said actuating devices from said racks to permit said cylinder and vertically movable member to return to their initial position.

17. An apparatus of the character described comprising a cylinder adapted to rotate about a vertical axis, a vertically movable member mounted adjacent to said cylinder, said cylinder and vertically movable member having normally coincident basic points, a cord connected with the basic point on said vertically movable member and extending through an eye in the periphery of said cylinder corresponding with the basic point thereof, a drum on which said cord is wound and from which it is unwound by the movement of either of said basic points from their point of coincidence, racks connected respectively with said vertically movable member and with said cylinder, a carriage, electrically operated actuating devices mounted on said carriage for engaging said racks respectively, and electrically operated means for moving said carriage to disengage said actuating devices from said racks to permit said cylinder and vertically movable member to return to their initial position when either said cylinder or said vertically movable member have been moved to a predetermined extent.

18. In a system of alternating electric current distribution having a reactive load, the combination with an electric meter having windings subject to current and pressure to cause motion proportional to the energy consumed; of a second electric meter having windings subject to current and pressure of the system and arranged to cause motion proportional to the reactive watts; a marking instrument having two complemental moving elements, one in the form of a chart and the other adapted to effect markings upon said chart, the chart being of cylindrical curvature and turned by one meter in one direction from zero position and the other marking instrument element being reciprocable in a direction substantially at right angles to the direction of movement of said chart and moved by the other meter in one direction from zero position; two coupling means respectively individual to said meters for coupling them with the marking instrument elements controlled thereby, and restoring devices respectively individual to said marking instrument elements for restoring the same to zero positions.

19. In a system of alternating electric current distribution having a reactive load, the combination with an electric motor having windings subject to current and pressure of the system and arranged to cause motion proportional to the energy consumed; of a second electric motor having windings subject to current and pressure of the system and arranged to cause motion proportional to the reactive watts; a marking instrument having two complemental moving elements, one adapted to mark the other, one rotative and turned by one motor in one direction from zero position, and the other reciprocable and moved by the other motor in one direction from zero position; two coupling devices respectively individual to said motors for coupling them with the marking instrument elements driven thereby; and mechanism for periodical restoring the complemental elements of the marking instrument to zero positions.

20. In a system of alternating electric current distribution having a reactive load, the combination with an electric motor having windings subject to current and pressure of the system and arranged to cause motion proportional to the energy consumed; of a second electric motor having windings subject to current and pressure of the system and arranged to cause motion proportional to the reactive watts; a recording instrument having two complemental moving elements, one adapted to mark the other, one in the form of a chart and operated by one motor in one direction from zero position and the other in the form of a marker operating upon the chart and operated by the other motor in one direction from zero position; two coupling devices respectively individual to said motors for coupling them with the recording instrument elements driven thereby; a restoring device for one of said recording instrument elements for restoring the same to zero position; a motor element; and mechanism periodically operated by said motor element for releasing the coupling devices and bringing the restoring devices into action.

21. In a system of alternating electric current distribution having a reactive load, the combination with an electric motor having windings subject to current and pressure of the system and arranged to cause motion proportional to the energy consumed, of a second electric motor having windings subject to current and pressure of the system and arranged to cause motion proportional to the reactive watts; a marking instrument having two complemental moving elements, one in the form of a chart, the other of said marking instrument elements being adapted to effect markings upon said chart, and mechanism for periodically restoring said complemental elements to zero positions.

22. In a system of alternating electric current distribution having a reactive load, the combination with an electric motor having windings subject to current and pressure of the system and arranged to cause motion proportional to the energy consumed; of a second electric motor having windings subject to current and pressure of the system and arranged to cause motion proportional to the reactive watts, a marking instrument having two complemental moving elements, one in the form of a chart, the other of said marking instrument elements being adapted to effect markings upon said chart, two coupling devices respectively individual to said motors for coupling them with the marking instrument elements driven thereby, and mechanism for periodically restoring the complemental elements of the marking instrument to zero positions.

23. In a system of alternating electric current distribution having a reactive load, the combination with an electric motor having windings subject to current and pressure of the system and arranged to cause motion proportional to the energy consumed, of a second electric motor having windings subject to current and pressure of the system and arranged to cause motion proportional to the reactive watts, a marking instrument having two complemental moving elements, one in the form of a chart, the other of said marking instrument elements being adapted to effect markings upon said chart, the chart being of cylindrical curvature and turned by one motor in one direction from zero position, and the other marking instrument element being reciprocable by the other motor in one direction from zero position, two coupling devices respectively individual to said motors for coupling them with the marking instrument elements driven thereby, and mechanism for periodically restoring the complemental elements of the marking instrument to zero positions.

24. In a system of alternating electric current distribution having a reactive load, the combination with an electric motor having windings subject to current and pressure of the system and arranged to cause motion proportional to the energy consumed, of a second electric motor having windings subject to current and pressure of the system and arranged to cause motion proportional to the reactive watts, a marking instrument having two complemental moving elements, one in the form of a chart, the other of said marking instrument elements being adapted to effect markings upon said chart, two coupling devices respectively individual to said motors for coupling them with the marking instrument elements driven thereby, a restoring device for restoring one of said marking instrument elements to zero position, a periodically operated resetting device, and mechanism operated by said resetting device for releasing the coupling devices and bringing the restoring device into action.

25. In a system of alternating electric current distribution having a reactive load, the combination with an electric motor having windings subject to current and pressure of the system and arranged to cause motion proportional to the energy consumed, of a second electric motor having windings subject to current and pressure of the system and arranged to cause motion proportional to the reactive watts, a marking instrument having two complemental moving elements, one in the form of a chart, the other of said marking instrument elements being adapted to effect markings upon said chart, the chart being of cylindrical curvature and turned by one motor in one direction from zero position, and the other marking instrument element being adapted to mark the first and reciprocable by the other motor in one direction from zero position, two coupling devices respectively individual to said motors for coupling them with the marking instrument elements driven thereby, a restoring device for restoring one of said marking instrument elements to zero position, an automatic electrically operated resetting device and mechanism periodically operated by said resetting device for releasing the coupling devices and bringing the restoring device into action.

26. In a system of alternating electric current distribution having a reactive load, the combination with an electric motor having windings subject to current and pressure of the system and arranged to cause motion proportional to the energy consumed, of a second electric motor having windings subject to current and pressure of the system and arranged to cause motion proportional to the reactive watts, a marking instrument having two complemental moving elements, one in the form of a chart and the other being adapted to effect markings upon said chart, the chart being of cylindrical curvature and turned by one motor in one direction from zero position and the other marking instrument element being reciprocable by the other motor in one direction from zero position, two coupling devices respectively individual to said motors for coupling them with the marking instrument elements driven thereby, a restoring device for restoring one of said marking instrument elements to zero position, a constant speed device, and mechanism periodically operated by said constant speed device for releasing the coupling devices and bringing said restoring device into action.

27. In a system of alternating electric current distribution having a reactive load, the combination with an electric motor having windings subject to current and pressure of the system and arranged to cause motion proportional to the energy consumed, of a second electric motor having windings subject to current and pressure of the system and arranged to cause motion proportional to the reactive watts, a marking instrument comprising a record sheet and a stylus cooperating therewith, coupling means for coupling one of said motors with said record sheet whereby said sheet is advanced in accordance with the measurement of said motor, coupling means for coupling the other of said motors with said stylus whereby said stylus is advanced across said record sheet in accordance with the measurement of the other of said motors, and means for periodically returning said stylus to zero position.

ROBERT C. LANPHIER.
FREDERICK C. HOLTZ.